(12) United States Patent
Blair et al.

(10) Patent No.: US 8,150,763 B2
(45) Date of Patent: *Apr. 3, 2012

(54) SYSTEMS AND METHODS FOR STAGING TRANSACTIONS, PAYMENTS AND COLLECTIONS

(75) Inventors: Paul Blair, Castle Rock, CO (US); Kurt Hansen, Parker, CO (US); Gary Moore, Mill Valley, CA (US)

(73) Assignee: The Western Union Company, Englewood, CO (US)

( * ) Notice: Subject to any disclaimer, the term of this patent is extended or adjusted under 35 U.S.C. 154(b) by 1083 days.

This patent is subject to a terminal disclaimer.

(21) Appl. No.: 11/461,642

(22) Filed: Aug. 1, 2006

(65) Prior Publication Data

US 2007/0100746 A1 May 3, 2007

Related U.S. Application Data

(63) Continuation-in-part of application No. 10/676,717, filed on Sep. 30, 2003, now Pat. No. 7,103,577, which is a continuation-in-part of application No. 10/444,111, filed on May 21, 2003, now Pat. No. 7,184,989, which is a continuation-in-part of application No. 10/112,258, filed on Mar. 29, 2002, now Pat. No. 7,107,249, which is a continuation-in-part of application No. 10/007,701, filed on Dec. 10, 2001, now Pat. No. 7,158,955, which is a continuation-in-part of application No. 09/990,702, filed on Nov. 9, 2001, now Pat. No. 7,092,916, and a continuation-in-part of application No. 09/823,697, filed on Mar. 31, 2001, now Pat. No. 7,165,052.

(51) Int. Cl.
*G06Q 40/00* (2012.01)

(52) U.S. Cl. .......................................... 705/38; 705/39
(58) Field of Classification Search .................. 705/38, 705/39
See application file for complete search history.

(56) References Cited

U.S. PATENT DOCUMENTS

| | | |
|---|---|---|
| 3,599,151 A | 8/1971 | Harr |
| 3,783,755 A | 1/1974 | Lagin |
| 3,833,395 A | 9/1974 | Gosnell |
| 4,032,931 A | 6/1977 | Haker |
| 4,321,672 A | 3/1982 | Braun et al. |
| 4,385,285 A | 5/1983 | Horst et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,795,892 A | 1/1989 | Gilmore et al. |
| 4,812,628 A | 3/1989 | Boston et al. |
| 4,902,881 A | 2/1990 | Janku |

(Continued)

*Primary Examiner* — Thomas Dixon
*Assistant Examiner* — Gerald Vizvary
(74) *Attorney, Agent, or Firm* — Kilpatrick Townsend & Stockton LLP

(57) ABSTRACT

The present invention relates to systems and methods for staging transactions and facilitating payments by consumers to a lender or merchant to consummate a financial transaction and/or to maintain a financial relationship. In one embodiment, a method for accepting payments from a consumer includes receiving a promise-to-pay record from a lender (210), receiving a payment from the consumer (220), associating the payment with the promise-to-pay record (230), and sending a notice to the lender (240), with the notice having an indicator that the payment has been received.

20 Claims, 3 Drawing Sheets

U.S. PATENT DOCUMENTS

| | | | |
|---|---|---|---|
| 4,961,142 A | 10/1990 | Elliott et al. | |
| 4,972,318 A | 11/1990 | Brown et al. | |
| 5,021,967 A | 6/1991 | Smith | |
| 5,053,607 A | 10/1991 | Carlson et al. | |
| 5,119,293 A | 6/1992 | Hammond | |
| 5,175,682 A | 12/1992 | Higashiyama et al. | |
| 5,220,501 A | 6/1993 | Lawlor et al. | |
| 5,283,829 A | 2/1994 | Anderson | |
| 5,350,906 A | 9/1994 | Brody et al. | |
| 5,367,452 A | 11/1994 | Gallery et al. | |
| 5,383,113 A * | 1/1995 | Kight et al. | 705/40 |
| 5,408,077 A | 4/1995 | Campo et al. | |
| 5,426,594 A | 6/1995 | Wright et al. | |
| 5,448,043 A | 9/1995 | Nakano et al. | |
| 5,461,217 A | 10/1995 | Claus | |
| 5,464,971 A | 11/1995 | Sutcliffe et al. | |
| 5,465,206 A * | 11/1995 | Hilt et al. | 705/40 |
| 5,477,037 A | 12/1995 | Berger | |
| 5,477,038 A | 12/1995 | Levine et al. | |
| 5,484,988 A | 1/1996 | Hills et al. | |
| 5,491,325 A | 2/1996 | Huang et al. | |
| 5,504,677 A * | 4/1996 | Pollin | 705/45 |
| 5,510,979 A | 4/1996 | Moderi et al. | |
| 5,513,117 A | 4/1996 | Small | |
| 5,524,073 A * | 6/1996 | Stambler | 705/75 |
| 5,546,523 A | 8/1996 | Gatto | |
| 5,550,734 A | 8/1996 | Tarter et al. | |
| 5,555,496 A | 9/1996 | Tackbary et al. | |
| 5,557,516 A * | 9/1996 | Hogan | 705/41 |
| 5,570,465 A | 10/1996 | Tsakanikas | |
| 5,577,109 A | 11/1996 | Stimson et al. | |
| 5,604,802 A | 2/1997 | Holloway | |
| 5,622,388 A | 4/1997 | Alcordo | |
| 5,629,982 A | 5/1997 | Micali | |
| 5,638,283 A | 6/1997 | Herbert | |
| 5,649,117 A | 7/1997 | Landry | |
| 5,650,604 A | 7/1997 | Marcous et al. | |
| 5,657,201 A | 8/1997 | Kochis | |
| 5,668,878 A * | 9/1997 | Brands | 380/30 |
| 5,677,955 A | 10/1997 | Doggett et al. | |
| 5,679,940 A | 10/1997 | Templeton et al. | |
| 5,686,713 A | 11/1997 | Rivera | |
| 5,696,827 A * | 12/1997 | Brands | 380/30 |
| 5,699,528 A | 12/1997 | Hogan | |
| 5,717,868 A | 2/1998 | James | |
| 5,721,768 A | 2/1998 | Stimson et al. | |
| 5,732,136 A | 3/1998 | Murphree et al. | |
| 5,732,400 A | 3/1998 | Mandler et al. | |
| 5,745,886 A | 4/1998 | Rosen | |
| 5,757,917 A | 5/1998 | Rose et al. | |
| 5,764,888 A | 6/1998 | Bolan et al. | |
| 5,774,879 A | 6/1998 | Custy et al. | |
| 5,778,067 A | 7/1998 | Jones et al. | |
| 5,779,379 A | 7/1998 | Mason et al. | |
| 5,783,808 A | 7/1998 | Josephson | |
| 5,787,403 A | 7/1998 | Randle | |
| 5,794,207 A | 8/1998 | Walker et al. | |
| 5,799,072 A | 8/1998 | Vulcan et al. | |
| 5,815,657 A * | 9/1998 | Williams et al. | 705/1 |
| 5,825,617 A | 10/1998 | Kochis et al. | |
| 5,826,241 A | 10/1998 | Stein et al. | |
| 5,828,875 A | 10/1998 | Halvarsson et al. | |
| 5,832,463 A | 11/1998 | Funk | |
| 5,870,718 A | 2/1999 | Spector | |
| 5,875,435 A | 2/1999 | Brown | |
| 5,878,211 A | 3/1999 | Delagrange et al. | |
| 5,880,446 A | 3/1999 | Mori et al. | |
| 5,893,080 A * | 4/1999 | McGurl et al. | 705/40 |
| 5,896,298 A | 4/1999 | Richter | |
| 5,897,625 A | 4/1999 | Gustin et al. | |
| 5,897,989 A | 4/1999 | Beecham | |
| 5,898,154 A | 4/1999 | Rosen | |
| 5,899,980 A | 5/1999 | Wilf et al. | |
| 5,899,982 A | 5/1999 | Randle | |
| 5,902,983 A | 5/1999 | Crevelt et al. | |
| 5,903,633 A | 5/1999 | Lorsch | |
| 5,903,881 A | 5/1999 | Schrader et al. | |
| 5,909,492 A | 6/1999 | Payne et al. | |
| 5,909,673 A | 6/1999 | Gregory | |
| 5,910,988 A | 6/1999 | Ballard | |
| 5,913,202 A | 6/1999 | Motoyama | |
| 5,915,023 A | 6/1999 | Bernstein | |
| 5,920,629 A * | 7/1999 | Rosen | 705/69 |
| 5,920,847 A | 7/1999 | Kolling et al. | |
| 5,920,848 A | 7/1999 | Schutzer et al. | |
| 5,923,016 A | 7/1999 | Fredregill et al. | |
| 5,937,396 A | 8/1999 | Konya | |
| 5,949,044 A | 9/1999 | Walker et al. | |
| 5,952,639 A | 9/1999 | Ohki et al. | |
| 5,953,709 A | 9/1999 | Gilbert et al. | |
| 5,953,710 A | 9/1999 | Fleming | |
| 5,960,412 A | 9/1999 | Tackbary et al. | |
| 5,963,647 A | 10/1999 | Downing et al. | |
| 5,963,925 A * | 10/1999 | Kolling et al. | 705/40 |
| 5,974,146 A * | 10/1999 | Randle et al. | 705/77 |
| 5,974,194 A | 10/1999 | Tackbary et al. | |
| RE36,365 E | 11/1999 | Levine et al. | |
| 5,987,426 A * | 11/1999 | Goodwin, III | 705/21 |
| 5,993,047 A | 11/1999 | Novogrod et al. | |
| 5,999,624 A * | 12/1999 | Hopkins | 705/70 |
| 6,003,763 A | 12/1999 | Gallagher et al. | |
| 6,011,833 A | 1/2000 | West | |
| 6,012,048 A | 1/2000 | Gustin et al. | |
| 6,015,087 A | 1/2000 | Seifert et al. | |
| 6,027,216 A | 2/2000 | Guyton | |
| 6,029,150 A * | 2/2000 | Kravitz | 705/39 |
| 6,030,000 A | 2/2000 | Diamond | |
| 6,032,133 A * | 2/2000 | Hilt et al. | 705/40 |
| 6,032,137 A | 2/2000 | Ballard | |
| 6,035,285 A | 3/2000 | Schlect et al. | |
| 6,035,406 A | 3/2000 | Moussa et al. | |
| 6,039,245 A | 3/2000 | Symonds et al. | |
| 6,039,250 A | 3/2000 | Ito et al. | |
| 6,044,360 A | 3/2000 | Picciallo | |
| 6,044,362 A | 3/2000 | Neely | |
| 6,045,039 A | 4/2000 | Stinson et al. | |
| 6,047,268 A | 4/2000 | Bartoli et al. | |
| 6,052,674 A * | 4/2000 | Zervides et al. | 705/40 |
| 6,058,417 A | 5/2000 | Hess et al. | |
| 6,064,990 A | 5/2000 | Goldsmith | |
| 6,070,150 A * | 5/2000 | Remington et al. | 705/34 |
| 6,070,156 A | 5/2000 | Hartsell et al. | |
| 6,070,798 A * | 6/2000 | Nethery | 235/462.01 |
| 6,078,907 A * | 6/2000 | Lamm | 705/40 |
| 6,081,790 A | 6/2000 | Rosen | |
| 6,088,683 A | 7/2000 | Jalili | |
| 6,088,684 A | 7/2000 | Custy et al. | |
| 6,097,834 A | 8/2000 | Krouse et al. | |
| 6,098,053 A * | 8/2000 | Slater | 705/44 |
| 6,106,020 A | 8/2000 | Leef et al. | |
| 6,119,106 A | 9/2000 | Mersky et al. | |
| 6,119,931 A | 9/2000 | Novogrod | |
| 6,122,625 A | 9/2000 | Rosen | |
| 6,128,603 A | 10/2000 | Dent et al. | |
| 6,134,561 A | 10/2000 | Brandien et al. | |
| 6,145,738 A | 11/2000 | Stinson et al. | |
| 6,148,377 A | 11/2000 | Carter et al. | |
| 6,149,056 A | 11/2000 | Stinson et al. | |
| 6,164,528 A | 12/2000 | Hills et al. | |
| 6,167,386 A | 12/2000 | Brown | |
| 6,175,823 B1 | 1/2001 | Van Dusen | |
| 6,189,787 B1 | 2/2001 | Dorf | |
| 6,193,152 B1 | 2/2001 | Fernando et al. | |
| 6,199,761 B1 | 3/2001 | Drexler | |
| 6,202,054 B1 | 3/2001 | Lawlor et al. | |
| 6,206,283 B1 | 3/2001 | Bansal et al. | |
| RE37,122 E | 4/2001 | Levine et al. | |
| 6,223,168 B1 | 4/2001 | McGurl et al. | |
| 6,246,996 B1 | 6/2001 | Stein et al. | |
| 6,247,047 B1 | 6/2001 | Wolff | |
| 6,260,024 B1 | 7/2001 | Shkedy | |
| 6,263,446 B1 | 7/2001 | Kausik et al. | |
| 6,269,369 B1 | 7/2001 | Robertson | |
| 6,275,829 B1 | 8/2001 | Angiulo et al. | |
| 6,282,522 B1 | 8/2001 | Davis et al. | |
| 6,286,756 B1 | 9/2001 | Stinson et al. | |
| 6,289,322 B1 | 9/2001 | Kitchen et al. | |

| | | | |
|---|---|---|---|
| 6,292,789 B1 | 9/2001 | Schutzer | |
| 6,305,604 B1 | 10/2001 | Ono | |
| 6,308,887 B1 | 10/2001 | Korman et al. | |
| 6,314,169 B1 | 11/2001 | Schelberg, Jr. et al. | |
| 6,317,745 B1 | 11/2001 | Thomas et al. | |
| 6,321,211 B1 | 11/2001 | Dodd | |
| 6,321,987 B1 | 11/2001 | Watanabe et al. | |
| 6,327,348 B1 | 12/2001 | Walker et al. | |
| 6,327,570 B1 | 12/2001 | Stevens | |
| 6,327,575 B1 | 12/2001 | Katz | |
| 6,334,108 B1 | 12/2001 | Deaton et al. | |
| 6,343,279 B1 | 1/2002 | Bissonette et al. | |
| 6,347,305 B1 | 2/2002 | Watkins | |
| 6,360,254 B1 | 3/2002 | Linden et al. | |
| 6,367,693 B1 | 4/2002 | Novogrod | |
| 6,386,444 B1 | 5/2002 | Sullivan | |
| 6,394,343 B1 | 5/2002 | Berg et al. | |
| 6,408,284 B1 | 6/2002 | Hilt et al. | |
| 6,411,942 B1 | 6/2002 | Fujimoto | |
| 6,415,271 B1 | 7/2002 | Turk et al. | |
| 6,438,586 B1 | 8/2002 | Hass | |
| 6,449,599 B1 | 9/2002 | Payne et al. | |
| 6,453,300 B2 | 9/2002 | Simpson | |
| 6,473,500 B1 | 10/2002 | Risaf et al. | |
| 6,484,936 B1 | 11/2002 | Nicoll et al. | |
| 6,488,203 B1 | 12/2002 | Stoutenburg et al. | |
| 6,502,747 B1 | 1/2003 | Stoutenburg et al. | |
| 6,510,453 B1 | 1/2003 | Apfel et al. | |
| 6,532,450 B1 * | 3/2003 | Brown et al. | 705/40 |
| 6,539,363 B1 | 3/2003 | Allgeier et al. | |
| 6,547,132 B1 | 4/2003 | Templeton et al. | |
| 6,549,119 B1 | 4/2003 | Turner | |
| 6,554,184 B1 | 4/2003 | Amos | |
| 6,601,038 B1 | 7/2003 | Kolls | |
| 6,609,113 B1 | 8/2003 | O'Leary et al. | |
| RE38,255 E | 9/2003 | Levine et al. | |
| 6,618,705 B1 | 9/2003 | Wang et al. | |
| 6,736,314 B2 | 5/2004 | Cooper et al. | |
| 6,761,309 B2 | 7/2004 | Stoutenburg et al. | |
| 6,761,311 B1 | 7/2004 | Algiene et al. | |
| 6,807,533 B1 * | 10/2004 | Land et al. | 705/30 |
| 6,814,282 B2 | 11/2004 | Seifert et al. | |
| 6,827,260 B2 | 12/2004 | Stoutenburg et al. | |
| 6,829,588 B1 | 12/2004 | Stoutenburg et al. | |
| 6,847,947 B1 | 1/2005 | Kambour et al. | |
| 6,886,742 B2 | 5/2005 | Stoutenburg et al. | |
| 6,908,031 B2 | 6/2005 | Seifert et al. | |
| 6,922,673 B2 | 7/2005 | Karas et al. | |
| 7,092,916 B2 | 8/2006 | Diveley et al. | |
| 7,103,577 B2 * | 9/2006 | Blair et al. | 705/74 |
| 7,107,249 B2 | 9/2006 | Diveley et al. | |
| 7,117,172 B1 * | 10/2006 | Black | 705/35 |
| 2001/0032878 A1 | 10/2001 | Tsiounis et al. | |
| 2001/0039535 A1 * | 11/2001 | Tsiounis et al. | 705/71 |
| 2001/0051876 A1 | 12/2001 | Seigel et al. | |
| 2001/0054003 A1 | 12/2001 | Chien et al. | |
| 2002/0016769 A1 * | 2/2002 | Barbara et al. | 705/40 |
| 2002/0023055 A1 * | 2/2002 | Antognini et al. | 705/40 |
| 2002/0032653 A1 * | 3/2002 | Schutzer | 705/40 |
| 2002/0046106 A1 | 4/2002 | Ishibashi et al. | |
| 2002/0062285 A1 * | 5/2002 | Amann et al. | 705/43 |
| 2002/0076018 A1 | 6/2002 | Banks et al. | |
| 2002/0087337 A1 | 7/2002 | Hensley | |
| 2002/0087462 A1 | 7/2002 | Stoutenburg et al. | |
| 2002/0087463 A1 | 7/2002 | Fitzgerald et al. | |
| 2002/0087467 A1 | 7/2002 | Muscavage et al. | |
| 2002/0087469 A1 | 7/2002 | Ganesan et al. | |
| 2002/0104026 A1 | 8/2002 | Barra et al. | |
| 2002/0111908 A1 | 8/2002 | Milberger et al. | |
| 2002/0143566 A1 | 10/2002 | Diveley et al. | |
| 2002/0143706 A1 | 10/2002 | Diveley et al. | |
| 2002/0143709 A1 * | 10/2002 | Diveley | 705/74 |
| 2002/0152168 A1 | 10/2002 | Neofytides et al. | |
| 2002/0152176 A1 | 10/2002 | Neofytides et al. | |
| 2002/0153414 A1 | 10/2002 | Stoutenburg et al. | |
| 2002/0161702 A1 | 10/2002 | Milberger et al. | |
| 2002/0169719 A1 | 11/2002 | Diveley et al. | |
| 2003/0018563 A1 * | 1/2003 | Kilgour et al. | 705/37 |
| 2003/0024979 A1 | 2/2003 | Hansen et al. | |
| 2003/0028491 A1 | 2/2003 | Cooper | |
| 2003/0055689 A1 | 3/2003 | Block et al. | |
| 2003/0055780 A1 | 3/2003 | Hansen et al. | |
| 2003/0061171 A1 | 3/2003 | Gilbert et al. | |
| 2003/0069856 A1 | 4/2003 | Seifert et al. | |
| 2003/0111529 A1 | 6/2003 | Templeton et al. | |
| 2003/0120777 A1 | 6/2003 | Thompson et al. | |
| 2003/0126036 A1 | 7/2003 | Mascavage et al. | |
| 2003/0126075 A1 | 7/2003 | Mascavage et al. | |
| 2003/0126083 A1 | 7/2003 | Seifert et al. | |
| 2003/0130907 A1 | 7/2003 | Karas et al. | |
| 2003/0130940 A1 | 7/2003 | Hansen et al. | |
| 2003/0130948 A1 | 7/2003 | Algiene et al. | |
| 2003/0135459 A1 | 7/2003 | Abelman et al. | |
| 2003/0149662 A1 | 8/2003 | Shore | |
| 2003/0154164 A1 | 8/2003 | Mascavage et al. | |
| 2003/0167237 A1 | 9/2003 | Degen et al. | |
| 2003/0177067 A1 | 9/2003 | Cowell et al. | |
| 2003/0187789 A1 | 10/2003 | Karas et al. | |
| 2003/0187791 A1 | 10/2003 | Weichert et al. | |
| 2003/0187792 A1 | 10/2003 | Hansen et al. | |
| 2003/0195811 A1 | 10/2003 | Hayes et al. | |
| 2003/0208445 A1 | 11/2003 | Compiano | |
| 2003/0222135 A1 | 12/2003 | Stoutenburg et al. | |
| 2003/0222136 A1 | 12/2003 | Bolle et al. | |
| 2003/0225689 A1 | 12/2003 | MacFarlane et al. | |
| 2004/0015438 A1 | 1/2004 | Compiano | |
| 2004/0019560 A1 * | 1/2004 | Evans et al. | 705/40 |
| 2004/0024701 A1 | 2/2004 | Hansen et al. | |
| 2004/0059672 A1 | 3/2004 | Baig et al. | |
| 2004/0068437 A1 | 4/2004 | McGee et al. | |
| 2004/0078327 A1 | 4/2004 | Frazier et al. | |
| 2004/0088248 A1 | 5/2004 | Cutler | |
| 2004/0088261 A1 | 5/2004 | Moore et al. | |
| 2004/0098328 A1 | 5/2004 | Grant et al. | |
| 2004/0098335 A1 | 5/2004 | Michelsen | |
| 2004/0107165 A1 | 6/2004 | Blair et al. | |
| 2004/0117302 A1 | 6/2004 | Weichert et al. | |
| 2004/0138947 A1 | 7/2004 | McGee et al. | |
| 2004/0139008 A1 | 7/2004 | Muscavage et al. | |
| 2004/0143552 A1 | 7/2004 | Weichert et al. | |
| 2004/0148286 A1 | 7/2004 | Rogers | |
| 2004/0153398 A1 | 8/2004 | Baumgartner et al. | |
| 2004/0158521 A1 | 8/2004 | Newton et al. | |
| 2004/0167860 A1 | 8/2004 | Baxter et al. | |
| 2004/0193897 A1 | 9/2004 | Van Volkenburgh | |
| 2004/0210476 A1 | 10/2004 | Blair et al. | |
| 2004/0210506 A1 | 10/2004 | Algiene et al. | |
| 2004/0210521 A1 | 10/2004 | Crea et al. | |
| 2004/0210523 A1 | 10/2004 | Gains et al. | |
| 2004/0211831 A1 | 10/2004 | Stoutenburg et al. | |
| 2004/0254833 A1 | 12/2004 | Algiene et al. | |
| 2005/0017067 A1 | 1/2005 | Seifert et al. | |
| 2005/0167481 A1 | 8/2005 | Hansen et al. | |
| 2005/0180550 A1 | 8/2005 | McGee et al. | |
| 2005/0187929 A1 | 8/2005 | Staggs | |
| 2005/0209958 A1 | 9/2005 | Michelsen | |
| 2005/0209961 A1 | 9/2005 | Michelsen | |

* cited by examiner

SYSTEMS AND METHODS FOR STAGING TRANSACTIONS, PAYMENTS AND COLLECTIONS

CROSS-REFERENCES TO RELATED APPLICATIONS

This application is a continuation-in-part application and claims the benefit of U.S. patent application Ser. No. 10/676,717, filed Sep. 30, 2003, entitled "Systems and Methods for Staging Transactions, Payments and Collections," the complete disclosure of which is incorporated herein by reference. The aforementioned application is a continuation-in-part of U.S. patent application Ser. No. 10/444,111, filed May 21, 2003, entitled "Staged Transactions Systems and Methods," which in turn is a continuation-in-part of U.S. Ser. No. 10/112,258, filed Mar. 29, 2002, entitled "Electronic Identifier Payment Systems and Methods, which in turn is a continuation-in-part of U.S. Ser. No. 10/007,701, filed Dec. 10, 2001, which in turn is a continuation-in-part of U.S. application Ser. No. 09/823,697, filed Mar. 31, 2001, and U.S. application Ser. No. 09/990,702, filed Nov. 9, 2001, the complete disclosures of which are also incorporated herein by reference.

BACKGROUND OF THE INVENTION

The present invention relates generally to financial transaction systems and methodologies, and in particular to systems and methods for staging transactions and facilitating payments by consumers to a lender or merchant to consummate a financial transaction and/or to maintain a financial relationship.

A wide variety of payment methods are available to purchasers of goods and services, or borrowers of money. Consumers may make purchases with currency, checks, money orders, debit cards, credit cards, and the like. Consumers may authorize the transfer of funds electronically from a customer account to a merchant or lender to satisfy an obligation. The success of each of these payment methods, however, is dependent on an actual transfer of funds. If the consumer account has insufficient funds to honor a check or to transfer electronically, the consumer will in all likelihood be notified by the merchant or lender that an additional payment attempt must be made. In some cases, the second or subsequent payment attempt must be tendered immediately or within a short period of time to avoid termination of the transaction, repossession of the purchased property, or the like. Thus, it would be desirable to have systems and methods in place so that the consumer can rapidly send payment, backed by sufficient funds, to a merchant or lender.

BRIEF SUMMARY OF THE INVENTION

The present invention relates generally to financial transaction systems and methodologies, and in particular to systems and methods for staging transactions and facilitating payments by consumers to a lender or merchant to consummate a financial transaction and/or to maintain a financial relationship.

In one embodiment, a method for accepting payments from a consumer according to the present invention includes receiving a promise-to-pay record from a lender, receiving a payment from the consumer, associating the payment with the promise-to-pay record, and sending a notice to the lender, with the notice having an indicator that the payment has been received. In some aspects, the record of the payment is stored in a database, and at least a portion of the payment is electronically sent to the lender.

In some aspects, a transaction identifier is used to help associate the payment with the promise-to-pay record. The promise-to-pay record may include a time limit by which the consumer must effect payment. In one aspect, the promise-to-pay record is received electronically and the payment is received physically (e.g., cash, cashier's check, or the like)

In another embodiment of the present invention, a method for staging a transaction involving a payment from a customer to a lender includes receiving a promise-to-pay from the customer and creating a promise-to-pay record. The promise-to-pay record, which includes a payment amount and an expiration, is transmitted to a payment service provider. The payment service provider is adapted to accept a payment from the customer if the customer attempts payment prior to the expiration. The method further includes receiving a notice of payment from the payment service provider if the latter received a payment from the customer that equals or exceeds the payment amount.

In one aspect, the promise-to-pay record is updated with the notice of payment. In some aspects, the method includes receiving a notice of non-effective payment from the payment service provider, with the notice of non-effective payment used in updating the promise-to-pay record. In some aspects, the payment made includes a delinquent amount owed by the borrower.

The summary provides only a general outline of the embodiments according to the present invention. Many other objects, features and advantages of the present invention will become more fully apparent from the following detailed description, the appended claims and the accompanying drawings.

DETAILED DESCRIPTION OF THE INVENTION

Figure 1:
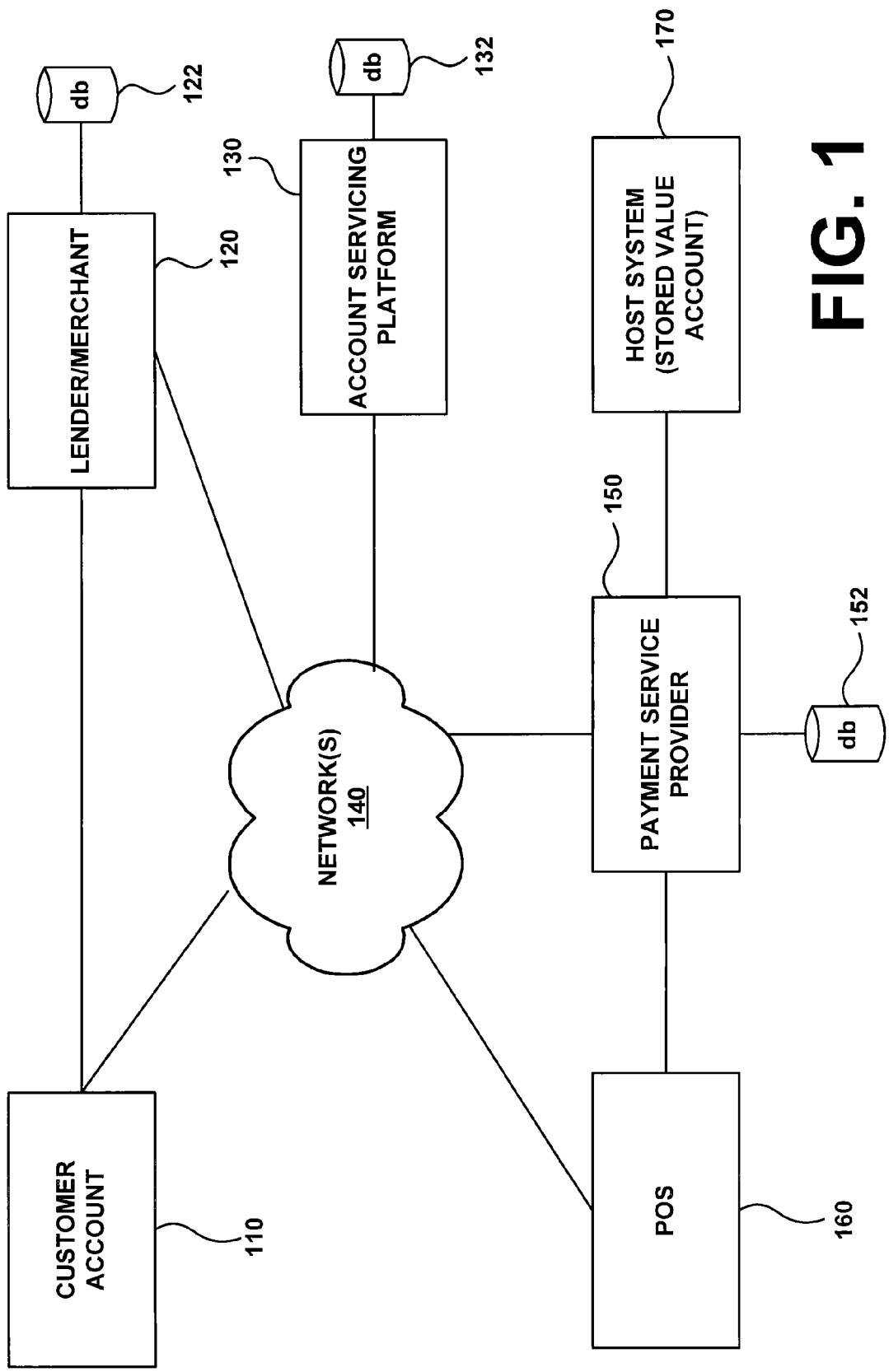
FIG. 1 is a simplified schematic of a financial transaction system according to an embodiment of the present invention.

Various detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a representative basis for teaching one skilled in the art to employ the present invention in a variety of manners.

Consumers have the ability to purchase a wide range of goods or services from a variety of merchants. The terms "consumer," "customer," "borrower," and the like are used interchangeably in some cases herein. In this context, "merchant" may be an individual, group of individuals, company, association, or other entity that offers or has provided goods and/or services to consumers. If the consumer is intending to purchase a home, automobile, or another expensive piece of real or personal property, the consumer may opt to borrow money from a lender. In some cases the merchant is the lender, and in other cases the lender is a third party. The borrowed monies typically are paid back to the lender, or a designated third party, over a period of time, typically within a designated term. As compensation for lending money, the lender typically charges the consumer interest on the unpaid loan principal at an agreed-to interest rate. The borrower repays the loan, plus interest, in a series of payments (e.g., monthly, quarterly, or the like). Typically, a portion of each payment is applied against the interest on the loan, and a portion is applied towards reducing the loan principal. For each payment, particularly early in the repayment schedule, the amount that goes towards reducing the principal can be relatively small.

As an example, a common scenario involves a consumer purchasing a home using at least some money borrowed from a lender. The lender places a mortgage on the home. The consumer, as mortgagee, pays off the mortgage on the home, usually over a period of years. Common mortgage terms extend for ten (10) years, fifteen (15) years, twenty (20) years, thirty (30) years, and the like. In its most basic form, repayment of the loan may involve the consumer mailing monthly checks to the mortgagor or mortgage company. The monthly payment typically is made at approximately the same time each month, with a grace period of a few days to weeks possibly available. The mortgage company, lender, or designated third party maintains a record of the mortgage and monitors repayment of the loan. The lender typically tracks the payment record of the consumer, including, whether the consumer has missed any payments and, if so, how many.

The consumer also may set up an electronic funds transfer (EFT) to automatically make the monthly payment. With direct payment or EFT, consumers can preauthorize electronic debits of a desired amount (e.g., the mortgage payment, the mortgage payment plus additional principal, and the like). The debit is authorized to be made to the consumer's credit account, checking account, brokerage account, or other designated consumer account. To initiate direct payment, the consumer provides written or other authorization to the lender. Authorizations may be cancelled at the discretion of the consumer according to procedures outlined in the authorization. Cancellation of the direct EFT payment, however, does not relieve the consumer of the underlying financial obligation. With appropriate authorization the lender, in the mortgage example, originates a computer file containing payment information. The lender transmits the debit through an automatic clearing house (ACH) network to the financial institution maintaining the consumer's designated account. The proper amount is debited from the customer's designated account, and forwarded to the lender or credited to a lender account. In such a manner, the monthly payment occurs automatically, and the consumer does not need to remember when the mortgage payment needs to be paid.

As noted above, in one embodiment the payment is sent to the merchant/lender through an ACH network. The ACH network operates to clear debits and credits electronically, rather than through the physical movement of checks. The ACH system uses batch processing, store and forward operations, and does not typically process payments individually. Originating depository financial institutions (ODFI) submit ACH payment files to the ACH operators. The ACH operators accumulate these files, sort them by destination, and transmit them to receiving depository financial institutions (RFDI) for application to customer accounts at predetermined times throughout the business day. The ACH system provides significant economies of scale compared to individual wire transfers, and is faster and more accurate than paper-check processing, and thus is an efficient electronic payment alternative to checks and wire transfers. The ACH-network delivers electronic payments quickly, safely, reliably, and conveniently to financial institutions for their customers.

While the ACH network is used for consumer transactions such as direct deposit and direct payment, and for business-to-business transactions, it also may be the settlement calculator for home-banking payments, credit card clearings, point-of-sale and Internet purchases, electronic check transmissions, and automated teller machine (ATM) transactions. The ACH system provides the basic infrastructure for a wide variety of electronic payment applications. The ACH network transfers payments and related data through computer and high-speed communications technology, e.g., the Internet.

In addition to establishing an EFT repayment scheme as noted above, a variety of other programs exist to provide for automated or semi-automated repayment of loans such as mortgages. One such example includes the Equity Accelerator® program provided by First Data Corporation of Englewood, Colo. In one embodiment, instead of having a single debit each month to the consumer's account, a debit equal to one-half of the monthly amount is made every two weeks. As a result, over the course of a fifty-two (52) week year, twenty-six (26) one-half payments are debited from the customer's account, resulting in the equivalent of one extra monthly payment paid to the lender. In this manner, the debt is repaid more quickly and/or equity in the mortgaged property increases more rapidly.

Each of the above-noted manual or automatic repayment scheme works well provided the consumer continues to repay the loan on the requested repayment schedule. The success of the repayment schemes, however, depends on the customer's designated account having sufficient funds on the date the debit is made. Problems can arise, with manual or automated repayment systems, in the event that the consumer's designated account does not have sufficient funds (NSF). This may occur, for example, when the consumer sends a check to the mortgage company that is drawn on an account having insufficient funds to pay the amount of the check when the check is presented to the consumer's financial institution. In this event, the lender and/or the consumer's financial institution will notify the consumer that the payment was not effectuated, and the check "bounces." A consumer's payment attempt also is ineffective if the consumer's designated account has insufficient funds for an EFT debit on the date the debit is to be made.

In some circumstances, the lender may permit a second or more attempt(s) at payment by the consumer, with additional penalties, late fees or other charges possibly included. The lender may have guidelines or firm rules which permit the consumer to make a late or delinquent payment. However, at some point the lender may seek return of the mortgaged property or merchandise to satisfy the outstanding debt. The lender may initiate foreclosure proceedings on the mortgaged property in an attempt to recoup the balance of the unpaid loan. In one embodiment, this may occur if the consumer has missed several payments in a row, or several payments over a designated period of time.

Prior to foreclosure, the lender may offer the consumer one final opportunity to render payment in a specified period of time. The lender likely will require the payment be made by cash since the consumer has not attempted payment on the appropriate payment schedule or has had payment attempts rejected because the consumer's designated account had insufficient funds (NSF). In one embodiment, the present invention facilitates this payment in a just-in-time manner to avoid foreclosure on the mortgaged property.

With reference to FIG. 1, additional details on a system 100 and methods according to the present invention will be described. In one embodiment, a customer owes monies to a lender/merchant for any of a number of reasons, including for the purchase of goods or services, loan repayment, and the like. A lender/merchant includes a lender/merchant control 120 which includes or is coupled to a database 122. Lender/merchant control 120 and database 122 are used to maintain accounts and other information related to the consumers they serve. For example, lender/merchant control 120 may include a system, software and related user interface which can view, present, query, revise, calculate and update customer data and customer account information. Such merchant controls 120 can be any type of computer or related device capable of communicating with other types of communication devices or computers. For example, merchant control 120 can be a mainframe computer, such as those available from Tandem, a server computer, a personal computer, a personal digital assistant (PDA), other wired or wireless devices, hand-held devices, and the like. Database 122 may be any of a wide variety of storage devices including, for example, magnetic storage systems such as tape or disk, optical storage systems, such as CD or DVD systems, and solid state systems such as RAM or ROM, and the like. Database 122 maintains a record of customer loans, purchases, payments, and the like. Each customer record in database 122 may include a wide range of information, including without limitation, customer name and address, customer's maternal or paternal maiden name, telephone or cell phone number(s), email address, password, loan number, loan amount, and the like.

The lender/merchant has a financial relationship with a consumer, borrower, or customer, as previously noted, to whom they have sold goods or services, lent money, or the like. Payments from the customer to the lender/merchant may occur, for example, by check. Payments also may be made by telephone or other communication device authorizing a debit to a customer account 110, and a subsequent electronic transfer of funds from account 110 to lender/merchant control 120 as further detailed above. In the event the lender/merchant requires a cash payment from customer 110, in one embodiment the lender/merchant directs the customer to a payment service provider 150. Lender/merchant or lender/merchant control 120 then stages a transaction within system 100 as further detailed below, so that the customer can make a payment to payment service provider 150 to satisfy the debt or obligation owed to the lender/merchant.

In one embodiment, the lender/merchant or lender/merchant control 120 stages the transaction in system 100 by transferring a customer's "promise to pay" to an account servicing platform 130. A promise-to-pay record is created and forwarded to payment service provider 150. The promise-to-pay record may contain all customer related information in lender/merchant control 120, or some subset thereof. In one embodiment, the promise-to-pay record further includes the amount and possible methods of payment (e.g., cash only), the time the payment is due, additional fees, taxes, discounts, and the like. In one embodiment the promise-to-pay record may further include instructions regarding whether a late payment would be accepted, and additional options such as whether amounts other than the requested amount would be accepted, whether multiple payments are accepted towards the requested amount, and the like. The promise-to-pay record can be manually created, such as by a representative of the lender/merchant. Alternatively, the promise-to-pay record is created automatically by mapping the appropriate consumer data from lender/merchant 120 records, such as those stored in database 122, to a promise-to-pay record form created for or associated with the consumer. The lender/merchant, in one embodiment, verifies the data accuracy and, if needed, corrects or updates data in the promise-to-pay record before forwarding to payment service provider 150. In another embodiment account servicing platform 130 maps the appropriate consumer data to create the promise-to-pay record, and forwards some or all of the promise-to-pay record to payment service provider 150.

In one embodiment, the promise-to-pay record is maintained on a database 152 associated with payment service provider 150. The consumer then tenders payment to payment service provider 150, which matches the consumer payment to the promise-to-pay record. The matching of the customer's payment to the promise-to-pay record may occur in several ways. For example, in one embodiment the customer provides proof of their identity and payment service provider 150 uses a customer name, address, telephone number, social security number, or the like to match the payment attempt to the proper promise-to-pay record. In another embodiment, the staging of the transaction by lender/merchant 120 may include providing the customer with a transaction identifier. The customer then provides the transaction identifier to payment service provider 150 so that payment service provider 150 can match the customer payment to the appropriate lender/merchant 120. Payment service provider 150 or an operator thereof will verify the appropriate information, payment amount, transaction identifier, and the like. If the staged transaction has a deadline, payment service provider 150 will verify compliance.

In one embodiment the transaction identifier includes an alphanumeric string of characters unique to the customer and/or unique to the transaction. In some cases, the transaction identifier may comprise several items of the customers' information including the customer's name, address, telephone number, social security number, account number, or the like. In one embodiment, merchant control 120 creates the transaction identifier. In other embodiments, the transaction identifier is created by account servicing platform 130 or payment service provider 150.

Payment from the consumer to payment service provider 150 may then occur. In one embodiment, the customer tenders a cash payment to payment service provider 150. Upon receipt of the payment, a record of the payment is transferred to account servicing platform 130, and in one embodiment, a receipt is provided to the customer. The funds and updated account record also are transferred to lender/merchant control 120. In an alternative embodiment, the customer may tender payment using a debit card. In some embodiments, the promise-to-pay record contains a list of acceptable payment methods for a particular consumer, or all consumers.

According to one embodiment, a stored value account may be used by the consumer to make a payment to the payment service provider 150. A typical stored value account operates by providing a host system 170 that can be maintained by the payment service provider 150 or a third party such as a bank or other financial institution. The host system may include a system, software and related user interface which can view, present, query, revise, calculate and update customer data and customer account information. Such host system 170 can be any type of computer or related device capable of communicating with other types of communication devices or computers. For example, host system 170 can be a mainframe computer, such as those available from Tandem, a server computer, a personal computer, other wired or wireless devices.

The host system 170 manages the stored-value account, maintaining records of such information as, for example, how much value exists in the account, where the value may be used, etc. In some cases, a token can be provided to an owner of the stored-value account, such as in the form of a magnetic-stripe card, although other tokens may be used, such as in the form of a chip card, rf device, and the like. The party maintaining the stored value account for the customer can receive money from the customer. An indication of the value of the money received is then stored as an electronic record in a stored value account of the customer on the host system 170. This money is then available for transfer at the request of the customer. Upon such a request, the money may be electronically sent to a recipient, such as the payment service provider 150 and the stored value account may be debited.

For example, when a transaction is to be executed using the value stored in the stored value account, such as when the customer wishes or is required to pay the payment service provider 150 from the stored value account, the customer can provide the token to the payment service provider 150 and information can be read from the token to identify the account. Alternatively, rather than providing the token, some other indication of the stored value account such as an account number or some identification can be provided by the customer at the time of the transaction. This identifier, whether provided by the customer or read from a token, can be transmitted to the host system 170, which retrieves records of the amount of value available for use by the customer and confirms that the transaction may proceed. For example, the payment service provider's location may include a device that is communicable with a host system 170 so that the stored value account in the host system 170 can be accessed. The host system 170 debits the value applied during the transaction from the account and performs settlement functions to ensure that the other party to the transaction, i.e., the payment service provider 150, is credited with that value.

In some embodiments, the consumer interacts with a point of service (POS) device 160 to facilitate payment to the lender/merchant. This may include having a third party receive the cash from the customer and input an authorization or transaction identifier into POS device 160 for transmission to payment service provider 150. POS device 160 communicates with payment service provider 150 in order to facilitate the transaction. For example, POS device 160 may present a screen with the transaction identifier and the amount of payment required by lender/merchant 120. Upon receipt of the payment from the customer, POS device 160 preferably provides a receipt to the customer indicating such payment has been made, and transfers a record of the payment to payment service provider 150.

POS device 160 can be any device disposed at the point-of-sale, or at some other location removed from a payment service provider 150 location. Thus, POS device 160 can be one such as is described in U.S. application Ser. No. 09/634,901, entitled "Point of Sale Payment System," filed Aug. 9, 2000, and U.S. Provisional Application No. 60/147,899, entitled "Integrated Point of Sale Device," filed Aug. 9, 1999, the complete disclosures of which are incorporated herein by reference for all purposes. POS device 160 also may be similar to those described in U.S. application Ser. No. 10/116,689, entitled "Systems and Methods for Performing Transactions at a Point-of-Sale," filed Apr. 3, 2002, the complete disclosure of which is incorporated herein by reference.

Based on the description provided herein, one of ordinary skill in the art will recognize other devices capable of operating as POS device 160. For example, POS device 160 can be a personal computer (PC), a personal digital assistant (PDA), other wired devices, and the like. POS device 160 also may be a mobile device, such as a wireless device, hand-held device, or the like.

At the time of payment, other funds may also be collected. For example, payment service provider 150, lender/merchant 120, or other third parties may charge and collect a fee for its services.

Upon or after receipt of the consumer's payment, an electronic record of the payment along with the transaction identifier is sent to payment service provider 150 and/or is stored in database 152. In one embodiment, the payment information is transmitted to account servicing platform 130, where it may be stored in database 132. Further, the transaction information is forwarded to lender/merchant 120, where it may be stored in database 122. The funds may be transferred conveniently by the automated clearing house (ACH) system, or other means.

Any or all of these communications may pass through one or more networks 140 as schematically depicted in FIG. 1. Network 140 can be one or more networks capable of transmitting and receiving information in relation to payment service provider 150, point-of-sale (POS) device 160, account servicing platform 130, or lender/merchant control 120. For example, network 140 may comprise a TCP/IP compliant virtual private network ("VPN"), the internet, a local area network (LAN), a wide area network (WAN), a telephone network, a cellular telephone network, an optical network, a wireless network, or any other similar communication network. In some embodiments network 140 is a combination of a variety of network types. For example, in one embodiment, a communication network comprises the internet for communication between POS device 160 and payment service provider 150, and a dial-up network for communicating between payment service provider 150 and account servicing platform 130. As will be appreciated by those skilled in the art, a number of other network types, and/or combinations are capable of facilitating communications between the various parties and components shown in FIG. 1.

Figure 2:
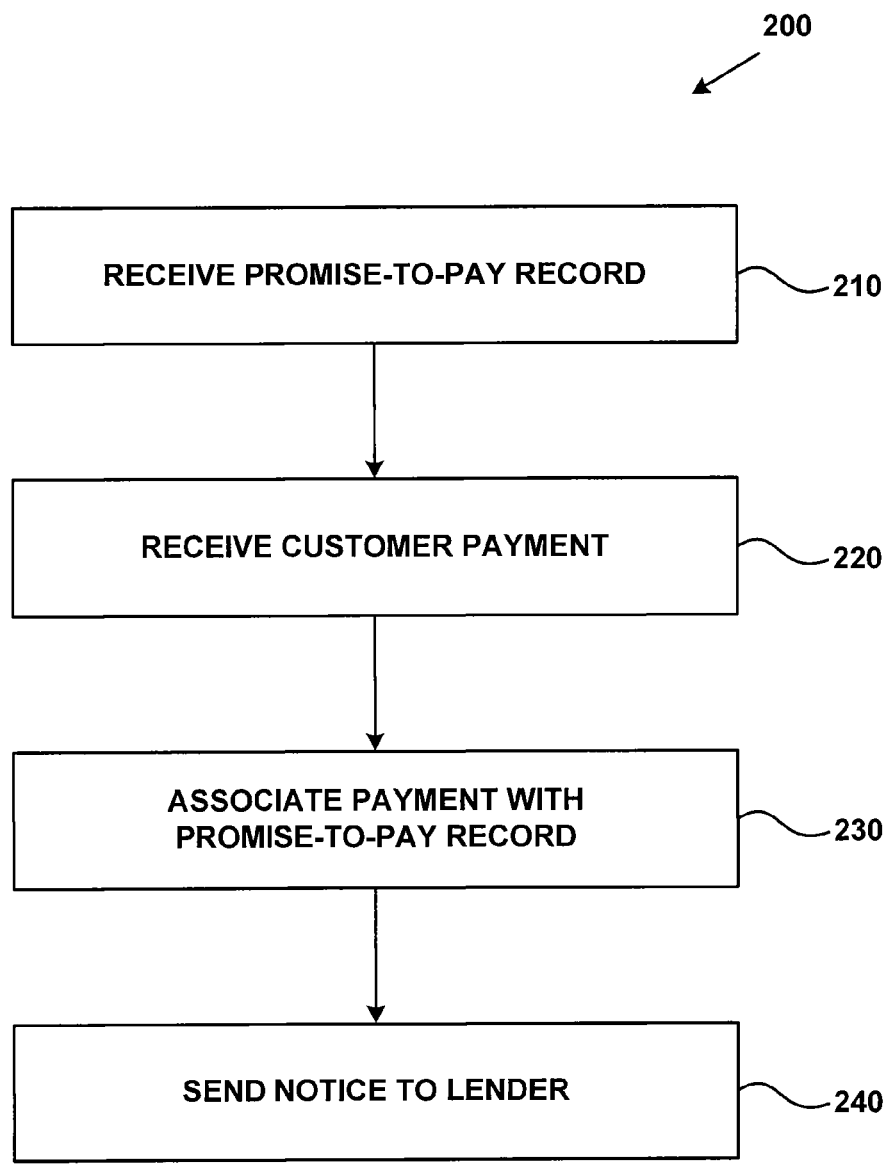
FIGS. 2-3 are simplified flow diagrams depicting methods according to the present invention.
Figure 3:
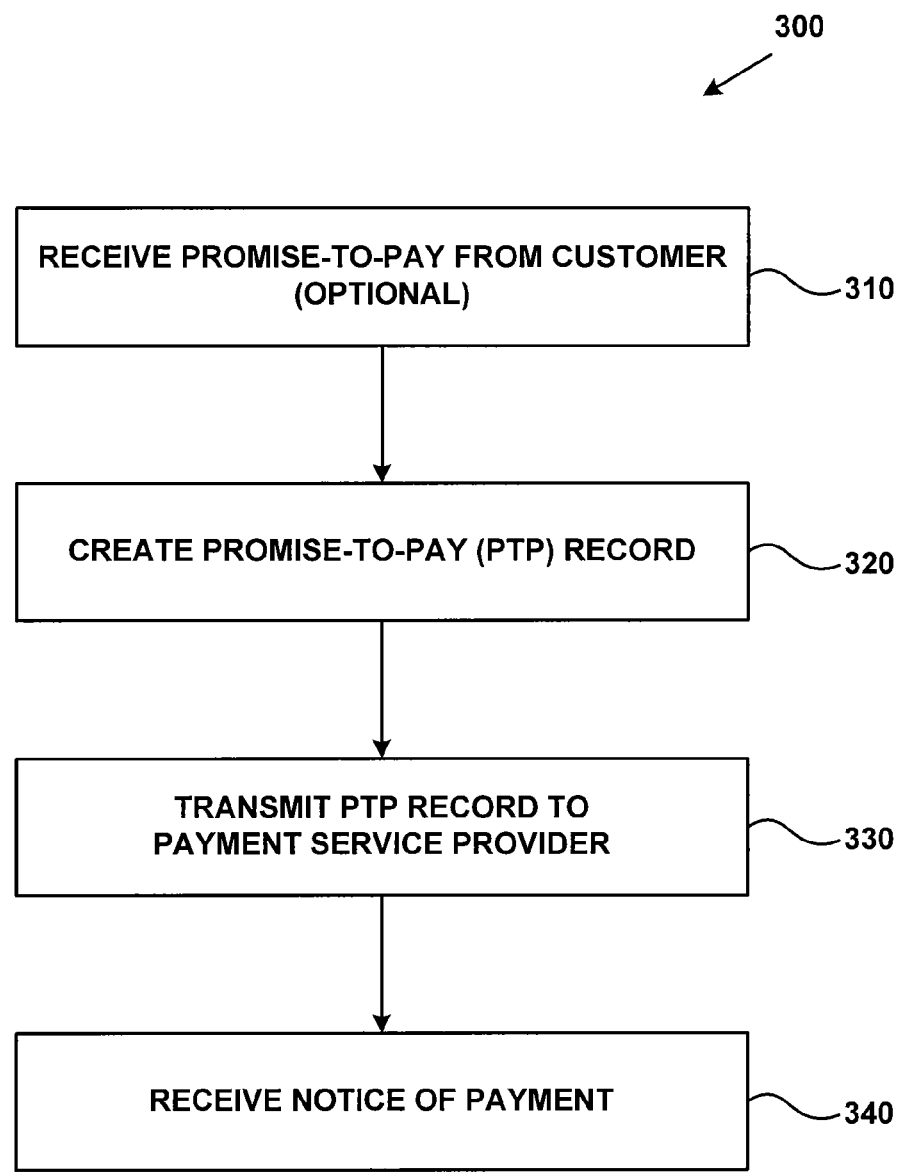

With reference to FIGS. 1, 2 and 3, alternative embodiments of methods of the present invention will now be described. In one embodiment, a method 200 will be at least partially performed by payment service provider 150 and a method 300 will be at least partially performed by account servicing platform 130. In the event a customer is delinquent in their payments, the lender/merchant or lender/merchant control 120 stages a transaction in which the customer will tender a payment to satisfy at least a portion of the debt owed to lender/merchant 120. This transaction may be staged in response to a customer "promise to pay" (Block 310), or may be initiated by the lender/merchant informing the customer of a "last chance to pay." In this embodiment, the lender/merchant directs the account servicing platform 130 to create a customer record from data obtained from lender/merchant control 120 and/or from database 122. In one embodiment, the customer record comprises a promise-to-pay record (Block 320). The customer data captured may include, inter alia, a customer account number, a customer order number, the customer name, customer address, customer telephone, customer email address, the purchase or payment amount, and, if applicable, taxes or other related fees or discounts. Account servicing platform 130 may further capture data related to the lender/merchant, which may include the lender/merchant's system information, name, address, contact information and the like. Some or all of this data, as a customer record or promise-to-pay record is transmitted to payment service provider 150. (Blocks 210 and 330).

Further, in one embodiment a transaction identifier is captured from lender/merchant 120, to be used for the staged transaction. In another embodiment, account servicing platform 130 identifies or creates a transaction identifier for the transaction. Again, the transaction identifier may be a string of alpha-numeric characters, or may include additional information that will permit payment service provider 150 and/or account servicing platform 130 to identify the particular transaction.

The customer is directed to one or more payment service provider 150 locations. This may include locations where the customer directly interacts with payment service provider 150 or an agent thereof. Alternatively, the customer is directed to a third party location that facilitates payment collection through a POS device 160. In another embodiment, the customer is matched to a mobile POS device 160. This may occur, for example, by having the customer meet an operator of the mobile POS device 160 at a designated location, at the customer's residence or place of employment, or the like.

In some embodiments, the customer is required to tender payment in a designated period of time, after which the ability to consummate the transaction will expire. In one embodiment, the expiration time or other conditions are included in the information maintained or received by account servicing platform 130. For example, the lender/merchant may indicate to the customer that they have a certain number of minutes, hours, or days to tender payment to payment service provider 150, either directly or through POS device 160.

When the customer attempts payment to payment service provider 150, payment service provider 150 or the operator thereof pulls or receives the account record from account servicing platform 130. This may include reviewing the promise-to-pay record. The operator or payment service provider 150 validates all relevant data prior to proceeding to ensure that the record is complete. Account servicing platform 130 provides the payment service provider 150 with relevant data so that payment service provider 150 can associate the customer and their payment to the particular transaction or promise-to-pay record. (Block 230). In some embodiments, the data transferred to payment service provider 150 includes time limits for receipt of payment, the transaction identifier, any or all of the above noted customer information, notes or comments identifying key legal or operational elements, that may further include a requirement that the customer provide identification prior to submission of payment.

In one embodiment, the transmission of the customer information from lender/merchant control 120, the staging of a transaction by the lender/merchant, lender/merchant control 120 or account servicing platform 130, and the transmission of relevant data to payment service provider 150 occurs in a sufficiently short period of time such that the transaction record is available at payment service provider 150 when the customer attempts to tender payment. The data or promise-to-pay record transferred need not contain the same information from customer to customer. Further, the record transferred to account servicing platform 130 may differ from the record transferred to payment service provider 150, which in turn may be different than the record maintained by lender/merchant control 120. In one embodiment, the records transferred will have at least one common reference or piece of data (e.g., the transaction identifier, customer name, or the like) to ensure the customer payment is correctly matched to the appropriate promise to pay record.

The customer then tenders cash payment to payment service provider 150 directly, or via POS device 160 (Block 220). In one embodiment, the customer is permitted to use a debit card to tender payment. Other payment mechanisms also may be used within the scope of the present invention. For example, rather than a cash payment or payment using a debit or credit card, a payment may be made using a pre-paid or stored value account such as described above. It will be appreciated by those skilled in the art that the processes of Block 220 and Block 230 may occur in a different order than shown in FIG. 2, or may occur simultaneously.

Once the customer is successfully matched or associated to a particular transaction and payment service provider 150 has received payment, a notice that the payment has been received is sent back from payment service provider 150 to account servicing platform 130 and/or to lender/merchant control 120 (Block 240 and Block 340). The notification may include a wide range of detail, including, the customer name, transaction identifier, the time and date the payment was received, the form of payment, the amount of payment, and the like. In one embodiment, the lender/merchant may submit queries to payment service provider 150 or account servicing platform 130 so that the lender/merchant is made aware of whether a customer has attempted or made payment.

The lender/merchant also may be sent a non-effective payment notice. This may occur if, for example, the customer fails to attempt payment within the required time period, attempts payment with an incorrect payment amount, attempts to pay using a payment means not approved for the transaction, fails to provide proper identification, fails to provide the transaction identifier, and a wide range of other actions or inactions. In one embodiment, the non-effective payment notice comprises or consists of a request for further instructions. For example, if a customer attempts payment after the time period has expired, payment service provider 150 may transmit a request for instructions to the lender/merchant, to account service platform 130, and/or to lender/merchant control 120. The request sent by payment service provider 150 may inquire as to whether it should accept the late payment attempt as tendered, charge a late fee, or the like. The request may contain further information to identify the customer or transaction, such as customer information, a transaction identifier, or the like. Payment service provider 150 then may await a response to the request for instructions prior to accepting payment from the customer, prior to issuing a receipt to the customer, or the like. In one embodiment, a response is sent to payment service provider 150 by lender/merchant control 120 or by account service platform 130. The response may or may not be sent by the recipient of the request. The response may include an instruction specific to the request for instructions (e.g., accept the late payment), or general instructions. It will be appreciated by those skilled in the art that additional instruction requests, and corresponding responses, also fall within the scope of the present invention.

The invention has now been described in detail for purposes of clarity and understanding. It will be appreciated by those skilled in the art that the examples described herein comprise a small subset of the possible uses of the methods in accordance with the present invention. It also will be appreciated that certain changes and modifications to the systems and methods of the present invention may be practiced within the scope of the appended claims. For example, a number of forms of system 100 may be implemented in accordance with the present invention. More particularly, system 100 can include any number of POS devices 160, account servicing platforms 130, payment service providers 150, and/or lender/merchant controls 120. Further, system 100 can be configured exclusively as an enrollment system as further detailed in U.S. application Ser. No. 10/444,111, previously incorporated herein by reference. System 100 also may operate exclusively as a payment system, or as some combination of payment and enrollment system. Further, the functions of the systems and methods of using such are merely exemplary.

Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for accepting a payment from a consumer for monies owed by the consumer to a lender pursuant to a financial relationship between the consumer and the lender, the method comprising:
- sending a promise-to-pay record from a lender system operated by the lender to a payment service provider system operated by a payment service provider distinct from the lender, the record comprising a set of identifiers forming a database, the database comprising existing promise-to-pay accounts, the set of identifiers being formatted into a consumer database, the promise-to-pay record identifying at least a payment amount and including a transaction identifier of the set of identifiers;
- sending a record of receipt of a cash payment from the consumer to the payment service provider, the record of receipt identifying a paid amount and including a purported identifier provided by the consumer;
- associating the record of receipt of the cash payment with the promise-to-pay record, wherein associating the record of the cash payment with the promise-to-pay record comprises matching the purported transaction identifier provided by the consumer with the transaction identifier included in the promise-to-pay record;
- receiving a notice from the payment service provider system at the lender system, the notice comprising an indicator that a payment has been received for the promise to pay record at a location of the payment service from the consumer, the indicator identifying the paid amount and a purported identifier provided by the consumer wherein the consumer is physically present at the location of the payment service provider when the payment is made; and
- receiving by the lender an electronic funds transfer of at least a portion of the paid amount from the payment service provider.

2. The method as in claim 1 further comprising storing a record of the cash payment in a database coupled with the payment service provider system.

3. The method as in claim 1, wherein the promise-to-pay record comprises a time limit, and wherein associating the record of receipt of the cash payment with the promise-to-pay record comprises verifying with the payment service provider system that the cash payment was made to the payment service provider within the time limit.

4. The method as in claim 3 further comprising sending a request for instructions from the payment service provider system to the lender system if the time limit expires without the payment service provider receiving the cash payment.

5. The method as in claim 3 further comprising sending a request for instructions from the payment service provider system to the lender system if the consumer attempts payment after the time limit expires.

6. The method as in claim 1, wherein:
- the promise-to-pay record includes information that identifies the customer; and
- associating the record of receipt of the cash payment with the promise-to-pay record comprises verifying a consumer identity through a comparison with the information that identifies the customer in the promise-to-pay record.

7. The method as in claim 1, wherein the customer comprises a borrower, and the promise-to-pay comprises a promise to pay a delinquent amount owed by the borrower.

8. The method as in claim 1 further comprising associating a transaction identifier with the promise-to-pay record with the lender system.

9. The method as in claim 8 further comprising providing the transaction identifier to the customer.

10. The method as in claim 1 further comprising receiving a request for instructions at the lender system from the payment service provider system.

11. The method as in claim 10 further comprising providing the payment service provider system with an instruction in response to the request for instructions from the lender system.

12. A non-transitory computer-readable medium for accepting a payment from a consumer for monies owed by the consumer to a lender pursuant to a financial relationship between the consumer and the lender, having sets of instructions stored thereon which, when executed by a computer, cause the computer to:
- send a promise-to-pay record from a lender system operated by the lender to a payment service provider system operated by a payment service provider distinct from the lender, the record comprising a set of identifiers forming a database, the database comprising existing promise-to-pay accounts, the set of identifiers being formatted into a consumer database, the promise-to-pay record identifying at least a payment amount and including a transaction identifier of the set of identifiers;
- send a record of receipt of a cash payment from the consumer to the payment service provider, the record of receipt identifying a paid amount and including a purported identifier provided by the consumer;
- associate the record of receipt of the cash payment with the promise-to-pay record, wherein associating the record of the cash payment with the promise-to-pay record comprises matching the purported transaction identifier provided by the consumer with the transaction identifier included in the promise-to-pay record;
- receive a notice from the payment service provider system at the lender system, the notice comprising an indicator that a payment has been received for the promise to pay record at a location of the payment service from the consumer, the indicator identifying the paid amount and a purported identifier provided by the consumer wherein the consumer is physically present at the location of the payment service provider when the payment is made; and
- receive by the lender an electronic funds transfer of at least a portion of the paid amount from the payment service provider.

13. The non-transitory computer-readable medium as in claim 12, wherein the promise-to-pay record comprises a time limit, and wherein associating the record of receipt of the cash payment with the promise-to-pay record comprises verifying with the payment service provider system that the cash payment was made to the payment service provider within the time limit.

14. The method as in claim 13 further comprising sending a request for instructions from the payment service provider system to the lender system if the time limit expires without the payment service provider receiving the cash payment.

15. The method as in claim 13 further comprising sending a request for instructions from the payment service provider system to the lender system if the consumer attempts payment after the time limit expires.

16. The non-transitory computer-readable medium as in claim 12, wherein:

the promise-to-pay record includes information that identifies the customer; and associating the record of receipt of the cash payment with the promise-to-pay record comprises verifying a consumer identity through a comparison with the information that identifies the customer in the promise-to-pay record.

17. The non-transitory computer-readable medium as in claim 12, wherein the customer comprises a borrower, and the promise-to-pay comprises a promise to pay a delinquent amount owed by the borrower.

18. The method as in claim 12 further comprising storing a record of the cash payment in a database coupled with the payment service provider system.

19. The method as in claim 12 further comprising associating a transaction identifier with the promise-to-pay record with the lender system.

20. The method as in claim 19 further comprising providing the transaction identifier to the customer.

* * * * *